(12) United States Patent
Fünfgeld

(10) Patent No.: US 10,085,553 B2
(45) Date of Patent: Oct. 2, 2018

(54) MODULAR SYSTEM, IN PARTICULAR FOR FURNITURE, EXHIBITION STRUCTURES OR THE LIKE, AND ITEM OF FURNITURE OR EXHIBITION CONSTRUCTION

(71) Applicant: SCHREINEREI WOLFGANG FÜNFGELD, Müllheim (DE)

(72) Inventor: Wolfgang Fünfgeld, Badenweiler (DE)

( * ) Notice: Subject to any disclaimer, the term of this patent is extended or adjusted under 35 U.S.C. 154(b) by 212 days.

(21) Appl. No.: 14/759,380

(22) PCT Filed: Dec. 10, 2013

(86) PCT No.: PCT/EP2013/076099
§ 371 (c)(1),
(2) Date: Jul. 6, 2015

(87) PCT Pub. No.: WO2014/111203
PCT Pub. Date: Jul. 24, 2014

(65) Prior Publication Data
US 2015/0335151 A1    Nov. 26, 2015

(30) Foreign Application Priority Data
Jan. 17, 2013    (DE) .................. 10 2013 100 481

(51) Int. Cl.
*F16B 1/00*    (2006.01)
*F16B 9/00*    (2006.01)
(Continued)

(52) U.S. Cl.
CPC ............ *A47B 47/00* (2013.01); *A47B 47/042* (2013.01); *F16B 12/14* (2013.01); *F16B 12/44* (2013.01); *Y10T 403/42* (2015.01)

(58) Field of Classification Search
CPC .......... F16B 2012/103; F16B 2012/166; F16B 12/463; F16B 12/505; F16B 12/24;
(Continued)

(56) References Cited

U.S. PATENT DOCUMENTS 2,254,973 A * 9/1941 Nalle .................. A47B 91/04
16/19
3,874,133 A * 4/1975 Silvius .................. F16B 12/125
403/311
(Continued)

FOREIGN PATENT DOCUMENTS

DE    1575228 A    1/1970
DE    2257090 A    11/1972
(Continued)

OTHER PUBLICATIONS

International Search Report issued in International Patent Application No. PCT/EP2013/076099, dated Mar. 25, 2014.
(Continued)

*Primary Examiner* — Amber R Anderson
*Assistant Examiner* — Nahid Amiri
(74) *Attorney, Agent, or Firm* — Jonathan A. Kidney; CKR Law LLP

(57) ABSTRACT

A modular system for furniture, exhibition structures having wall modules with wall surfaces situated opposite one another—opposite front and rear surfaces and opposite contact areas, comprising connecting elements connecting the wall modules having L-shaped, T-shaped or cruciform cross-sectional area. The wall modules have a recess for receiving the connecting element which is matched to the shape of the recess. The recess runs from the contact area on one side of the wall module, in the direction of the contact area, on the other side of the wall module and passes through the wall module in the direction of a wall surface to the opposite wall surface, and is situated between sections of the front surface and rear surface which are situated opposite one another. The connecting elements, when they are inserted into the recess in a wall module, correspond to the distance between the wall surfaces.

16 Claims, 8 Drawing Sheets

(51) Int. Cl.
*F16L 41/00* (2006.01)
*A47B 47/00* (2006.01)
*A47B 47/04* (2006.01)
*F16B 12/14* (2006.01)
*F16B 12/44* (2006.01)

(58) Field of Classification Search
CPC .......... F16B 12/20; F16B 12/14; F16B 12/10;
F16B 12/02; F16B 12/46; F16B 12/44;
F16B 5/0004; F16B 5/0024; F16B
5/0028; Y10T 403/42; Y10T 403/72;
Y10T 403/725; Y10T 403/73; A47B
47/00; A47B 47/008; A47B 47/0016;
A47B 47/0025; A47B 47/0033; A47B
47/0066; A47B 47/0075
USPC ........ 403/DIG. 13, 217, 218, 219, 265, 266,
403/267; 52/285.1, 285.3, 582.1, 586.1;
211/182, 194
See application file for complete search history.

(56) References Cited

U.S. PATENT DOCUMENTS

| | | | | |
|---|---|---|---|---|
| 4,045,104 A * | 8/1977 | Peterson | ................ | A47B 47/03 211/182 |
| 4,455,102 A * | 6/1984 | Baroi | ................... | F16B 5/0614 403/173 |
| 4,886,326 A * | 12/1989 | Kuzyk | ............... | A47B 47/0041 108/180 |
| 5,240,317 A * | 8/1993 | Presnick | .............. | A47B 47/042 312/111 |
| 5,470,139 A * | 11/1995 | Hsiao | .................. | A47B 47/005 312/111 |
| 6,371,035 B1 * | 4/2002 | Schiedegger | .......... | A47B 47/00 108/180 |
| 6,389,773 B1 * | 5/2002 | Reuter | .................. | E04B 2/7425 160/135 |
| 7,918,515 B2 * | 4/2011 | Wang | .................. | A47B 47/005 211/194 |
| 7,967,401 B2 * | 6/2011 | Hsu | ...................... | A47B 47/0008 312/108 |
| 9,414,985 B2 * | 8/2016 | Ugartechea Berlanga | | .................. E04H 13/008 |
| 2005/0200250 A1 * | 9/2005 | Zillmann | ............ | F16B 12/2027 312/265.5 |
| 2012/0216389 A1 * | 8/2012 | Becker | ................ | B63B 35/7916 29/525.01 |
| 2013/0068762 A1 * | 3/2013 | Ma | ...................... | F16B 12/2036 220/4.27 |

FOREIGN PATENT DOCUMENTS

| | | |
|---|---|---|
| DE | 2227443 A | 12/1972 |
| DE | 26 17 614 A1 | 11/1976 |
| DE | 9401222 U1 | 6/1994 |
| DE | 29700234 U1 | 1/1997 |
| DE | 103 00 590 A1 | 7/2004 |
| DE | 10 2007 043561 A1 | 3/2008 |
| DE | 202008000485 U1 | 4/2008 |
| DE | 10 2007 043 564 A1 | 6/2008 |
| DE | 10 2007 043 985 A1 | 3/2009 |
| GB | 2271051 A | 4/1994 |
| JP | 2005-121142 A | 5/2005 |
| JP | 2010-167020 A | 8/2010 |
| WO | 2005/087048 A1 | 9/2005 |

OTHER PUBLICATIONS

Office Action issued in German Patent Application No. 10 2013 1100 481, dated Sep. 18, 2013.
Office Action issued in German Patent Application No. 10 2013 1100 481, dated Mar. 12, 2015.

* cited by examiner

MODULAR SYSTEM, IN PARTICULAR FOR FURNITURE, EXHIBITION STRUCTURES OR THE LIKE, AND ITEM OF FURNITURE OR EXHIBITION CONSTRUCTION

CROSS REFERENCE TO RELATED APPLICATION(S)

This application is a U.S. National Stage application of International Application PCT/EP2013/076099 filed Dec. 10, 2013, claiming priority to DE Patent Application No. 10 2013 100 481.4, filed Jan. 17, 2013, the contents of which are hereby incorporated by reference in its entirety

FIELD OF INVENTION

This invention is directed to modular furniture.

BACKGROUND

Furniture, exhibition structures and the like are to an increasingly great extent no longer delivered in a ready-to-use, assembled state, but rather as a set of individual parts which are assembled upon delivery by agents of the supplier or the purchaser, or by the purchaser if he is picking it up himself.

A consequence of this development has been the creation of modular systems from which the furniture, exhibition structures or even more of the like, e.g. room structures, can be assembled. One such modular system for furniture, exhibition structures or the like generally consists of a series of standardized furniture or exhibition stand components, e.g. wall, ceiling, and/or floor modules which in this written description are summarized under the concept of "wall modules," and connecting elements with which the standardized parts are connectable with one another.

By combining the components and/or varying the structure itself, the item of furniture or exhibition structure assembled from the modular system can be adjusted simply and flexibly to the space in which it is to be installed, but also to the customer's desires and ideas. Besides this obvious advantage for the customer, such modular systems nevertheless also provide substantial advantages for the manufacturer, since a broader assortment of completely different items of furniture and exhibition structures can be offered on the basis of a few individual structural components, each of which can then be conveniently manufactured in high volumes.

Such modular systems for furniture, exhibition structures or the like are known, for example, from WO 2005/087048 A1, DE 102007043561 A1 and DE 102007043564 A1.

What is problematical with the modular systems for furniture, exhibition structures or the like known from these publications, however, is the fact that essentially plate-shaped sections of the connecting elements are, at least in sections, received in grooves which are provided in the wall modules, wherein the grooves in the wall module run from its front surface which, in assembled furniture faces the observer, to the back surface which is situated opposite to said front surface, and lie between surface areas of the wall surfaces of the wall module, that is, of those surfaces which in the assembled item of furniture define a boundary of the same within its interior space or to the exterior space.

This groove geometry tends toward breaking out when it is subjected to a heavy load, which is particularly the case when a wall module is lifted with its connecting elements inserted, which for example is often the case when assembling an item of furniture or exhibition stand in order to make a connection with an additional wall module on the side of the wall module lying opposite to the already-inserted connector.

SUMMARY

The technical task underlying the invention consist of providing a modular system for furniture, exhibition structures or the like, in particular for rack-like pieces having a plurality of compartments, which is simple to produce and install but which simultaneously lends the assembled modules a high degree of stability.

This task is solved by means of a modular system for furniture, exhibition structures and the like having the features described below.

The modular system according to the invention for furniture, exhibition structures or the like comprises, as usual, wall modules and connecting elements for the wall modules. Wall modules are understood to include components which, if the module is assembled into an item of furniture, form a wall portion of an inner or outer wall of the item of furniture or exhibition stand or a part of the same, e.g. walls, floors and/or ceilings of a rack compartment, but also floor plates, ceiling plates or side walls of the item of furniture.

The wall modules each have—likewise as usual—wall surfaces which are situated opposite one another, a front surface and a rear surface which is situated opposite the front surface and contact areas which are situated opposite one another.

The areas which define the surface of a wall in the interior of the assembled item of furniture or exhibition stand are therefore designated as wall surfaces, in particular floors, ceilings and side surfaces of rack compartments.

In contrast thereto, according to this description, the front surfaces are those surfaces of the wall module which, in the assembled condition of the item of furniture or exhibition stand are turned toward the observer, rear surfaces are those which are situated opposite the front surfaces and the contact areas are those surfaces of the wall module which are adapted to be in contact with a contact area of another wall module in the assembled condition of the item of furniture or exhibition stand.

As a precaution, it is noted that these definitions are obvious in terms of any given wall module. Since the wall modules are purposefully formed as plates or boards, that is, bodies which are in the basic form of a flat cuboid, it is a given which surfaces are usable as wall surfaces, namely both of the larger surfaces of the cuboid-shaped body. In addition thereto, contact areas on which contact to other wall modules is established, in particular by means of connecting elements, are clearly distinguishable for the user who assembles the item of furniture, exhibition stand or the like from the modular system, and certainly for a person skilled in the art, since the connecting elements do not allow for any connection of the front side and the rear side surfaces with one another.

The modular system for furniture, exhibition structures or the like furthermore comprises connecting elements for purposes of connecting the wall modules with one another, wherein at least one cross-sectional area of the connecting element is L-shaped, T-shaped or cruciform. The basic shape given thereby defines whether the connector is for two, three or four wall modules, since an L-shaped connecting element has two sections, a T-shaped connecting element has three sections and a cruciform connecting element has four section for inserting into a recess, each of which is formed from the two arms of the L, the three arms of the T or the four arms of the cross.

It is fundamental to the invention that the wall modules have at least one recess for precisely receiving in each case one portion of the connecting element which is matched to the shape of the recess, wherein the recess meets the following conditions:

Firstly, beginning from the contact areas on one side of the wall module, it extends in the direction of the contact areas on the other side of the wall module which is situated opposite to it.

Secondly, it passes through the wall module from one wall surface to the wall surface situated opposite thereto.

Thirdly, it is situated between portions of the front surface and the rear surface which are situated opposite one another.

Furthermore, the extent of the portions of the connecting elements, when they are inserted into the recess of a wall module in the direction perpendicular to the wall surfaces of the wall module which are situated opposite one another, corresponds to the distance of the wall surfaces of the wall module which are situated opposite one another. This condition differentiates the connecting elements in particular from those which provide surface insertion guides or guide rails that are not inserted into the recess of a wall module, in portions on at least one of its surfaces. It is fulfilled in particular if the cross section of the arm of the connecting element is matched to the cross-section of the recess, or if the same cross-sections are present.

This design brings with it a series of significant advantages. In particular, since the connecting elements are inserted into recesses which pass through the wall module from one wall surface to the wall surface which is situated opposite and only extend across a small fraction of the total distance between the front surface and back surface, the danger of a break out of the wall module under load, in particular also if the wall module is tilted while the item of furniture or exhibition structure is being assembled, is significantly reduced.

At the same time, the reciprocal matching between the shape of the section of the connecting element and the recess guarantees on the one hand, that, in the assembled state of the item of furniture or exhibition structure, a flat, continuous material surface is present even in the region of the recess, which is of particular importance for wall modules used as rack floors and, on the other hand, produces an exactly oriented connection having little play in the connected state.

In addition, a very stable connecting element is provided by means of this measure in combination with the matching of a dimension of the connecting element to the distance of the wall surfaces of a wall module which is situated opposite to it, which is in broad contact with the wall module. This is important above all for wall modules standing perpendicular to the surface on which the item of furniture, the exhibition structure or the like is to be assembled, since the load of wall modules situated further from the ground can thereby be introduced into the connecting element and transmitted from it in the direction of the next wall module situated perpendicular to the floor, and an effective load transfer is thus produced, which is beneficial to the stability of the item of furniture, exhibition structure or room structure.

Because of their simple geometry, which brings with it particularly low costs both in terms of manufacturing the connecting elements and in the introduction of the recesses into the wall modules, the connecting elements preferably have bar-shaped sections in the shape of L-form, T-form or cruciform sections interconnected with one another. It must thus be noted that the connecting elements of the foregoing shape, which are also formed from a single piece, e.g. cast or produced by metal injection molding, have sections that can be interconnected with one another.

A section is thus particularly bar-shaped if it extends straight in the direction of its extension and, perpendicular to the direction of its extension, has at least in a partial portion a rectangular cross section with a ratio of the longer side of the rectangle to the shorter side of the rectangle of <5, preferably <2 or a square cross-section. However, for a portion to be bar-shaped, it is not absolutely necessary that it have a face parallel to its cross-section which borders the portion in a direction perpendicular to its cross-section. In particular, the face may also be curved or semicircular or have some other shape.

Further according to this design, the extent of the rectangular cross-section of the bar-shaped portions of the connecting elements in the direction of one side of the rectangle corresponds to the distance of the wall surfaces of a wall unit which are situated opposite one another and, in the direction of the other side of the rectangle, to the extent of the recess in the direction of the direct connection between front and rear surfaces and preferably is only a small fraction, particularly less than ¼, of the total distance between the front surface and the rear surface.

The attachment between wall module and connecting element can thus be achieved in different ways. In principle, it suffices if one portion of a connecting element has a bore which, if the connecting element is inserted as intended by one of its portions into the recess of a wall module, runs in the direction of the direct connection between the front and rear surfaces of the wall module. A screw can then pass through the wall module to engage said bore or be guided through it. A corresponding bore is advantageously provided in the wall module for that purpose, but it can also first be produced during assembly.

An alternative, preferred possibility exists in that the recess of the wall module is provided with a tenon extending in the direction of the direct connection between the contact areas, and that the connecting element comprises at least one portion having a bore for precisely receiving the tenon. It is particularly preferred if a bore is additionally arranged in the tenon, particularly a threaded bore, preferably having a conical insertion portion running in the direction of the direct line of connection between the oppositely situated wall surfaces of the wall module, and the portion of the connecting element which receives the tenon in the bore has a corresponding bore which, with the intended arrangement of the connecting element to a wall module, runs in the direction of the direct line of connection between the oppositely situated wall surfaces of the wall module, such that the connection between wall module and connecting element can be fixed through these bores, for example by screwing in a screw. This leads to a very simple fixation of the wall module during assembly, since it only needs to be inserted and fixed using a screw in a pre-drilled (threaded) bore.

In particular, a peg screwed into the wall module can be used as the tenon, such as may be obtained, for example, from Scheulenburgdirekt GmbH & Co. KG.

In a particularly preferred embodiment of the invention, it is provided that at least one connecting element comprises a threaded bore for adjustably receiving a furniture foot or exhibition stand foot arranged on a screw. This makes separate receivers for any provided furniture feet or exhibition stand feet superfluous and additionally enables in a very simple manner the item of furniture or the exhibition structure to also be set up on uneven ground in such a way that its individual racks or compartments are level.

In particular, with the modular system according to the invention, it can suffice to combine two given wall modules with one another, each using only a single connecting element. For that, it is particularly convenient if the recess is situated equidistant from the front surface and the rear surface of the wall module.

It is particularly advantageous if the contact area is wedge-shaped and comprises subareas which, beginning from the wall surfaces of the wall module, extend at an angle of 45° from said wall surfaces outwardly to converge with one other. Due in particular to the fact that, by matching the recess to the corresponding length of the bar-shaped portion of the associated connecting element to be received, contact is created between the subareas of different modules once the item of furniture or the exhibition structure is assembled, this shape of the contact areas leads to an advantageous transfer of the forces which are particularly exerted on wall modules which are used as footings for a compartment, to supporting wall modules that run perpendicular thereto.

An item of furniture according to the invention or an exhibit structure according to the invention is distinguished by the fact that the item of furniture or exhibition structure is based at least in part on a modular system for furniture, exhibition structures or the like according to the invention.

Particularly preferred is an item of furniture or exhibition structure in which the load of the wall module arranged perpendicular to a floor on which the item of furniture or the exhibition structure stands is passed to the connecting elements, which connect the respective wall module with the adjacent wall module arranged perpendicularly to the floor in a direction toward the floor, and is transferred from it to this adjacent wall module.

It is particularly advantageous in terms of the stability of the item of furniture or exhibition structure if subareas of the contact areas of different wall modules are supported by one another.

BRIEF DESCRIPTION OF DRAWINGS

The invention will be described in greater detail in the following based on the drawings, which represent the specific embodiments of the invention. What is shown is.

DETAILED DESCRIPTION OF DRAWINGS

In all of the figures, the same components of the same embodiment are marked with the same reference numbers unless stated otherwise. Furthermore, in the figures in which certain components appear multiple times, not all of them are provided with the associated reference numbers in order to ensure the clarity of the figures.

Figure 1:
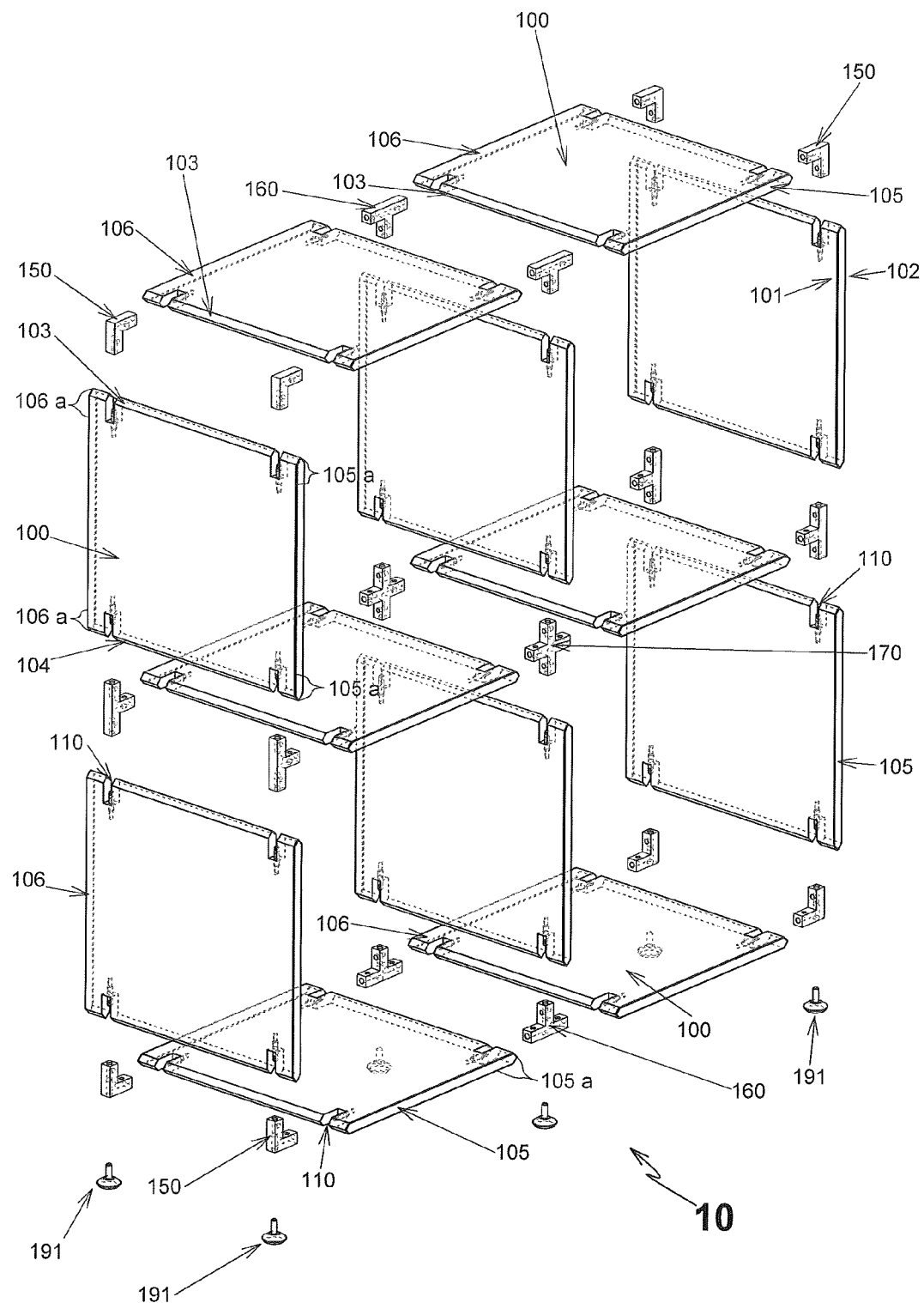
FIG. 1: a modular system for furniture, exhibition structures or the like, represented as an exploded view of one of the item of furniture assembled from the modular system.

It must furthermore be noted that in FIGS. 1, 2*a* and 2*b*, the components of the modular system for furniture, exhibition structures or the like are represented as being transparent, which is naturally not the case in reality, but which brings with it a more informative representation.

FIG. 1 shows a modular system 10 for furniture, exhibition structures or the like with wall modules 100. The wall modules 100 have a plate-like basic shape with two large surfaces 101, 102, which form the upper and lower sides of the plate, and four circumferential edge surfaces 103, 104, 105, 106.

The large surfaces 101, 102 serve as wall portions in the item of furniture assembled as intended, such that these surfaces 101, 102 form the wall surfaces of the wall module 100.

The circumferential edges 103, 104 are the surfaces of the wall module, by means of which it is connected to other wall modules in the assembled item of furniture, that is, the edge surfaces 103, 104 are the contact areas of the wall module 100. They are each designed not as flat surfaces, but rather as a wedge-shaped abutting profile, which is formed respectively from subareas 103*a*, 103*b*, 104*a*, 104*b* which, beginning from the wall surfaces 101, 102 of the wall module 100 run outwardly at an angle of 45° toward one another, until they touch a contact line 103*c*, 104*c*.

This shape, particularly in combination with a corresponding adjustment of the recesses 110 described further below to the length of the bar-shaped portions of the connecting elements 150, 160, 170 to be inserted, leads to the fact that two, three or four wall modules 100 can be arranged in L-form, T-form or cruciform shapes such that the respective subareas 103*a*, 103*b*, 104*a*, 104*b* lie adjacent to one another, such that horizontally arranged wall modules 100 above these subareas can be supported by perpendicularly arranged wall modules 100. This also ensures that, viewed from the front side and the rear side of the assembled item of furniture or exhibition structure, a closed surface is created such that the connecting elements 150, 160, 170 in the viewing direction are concealed.

The remaining edge surfaces are the front surface 105 and the rear surface 106 of the wall module 100.

Figure 3A:
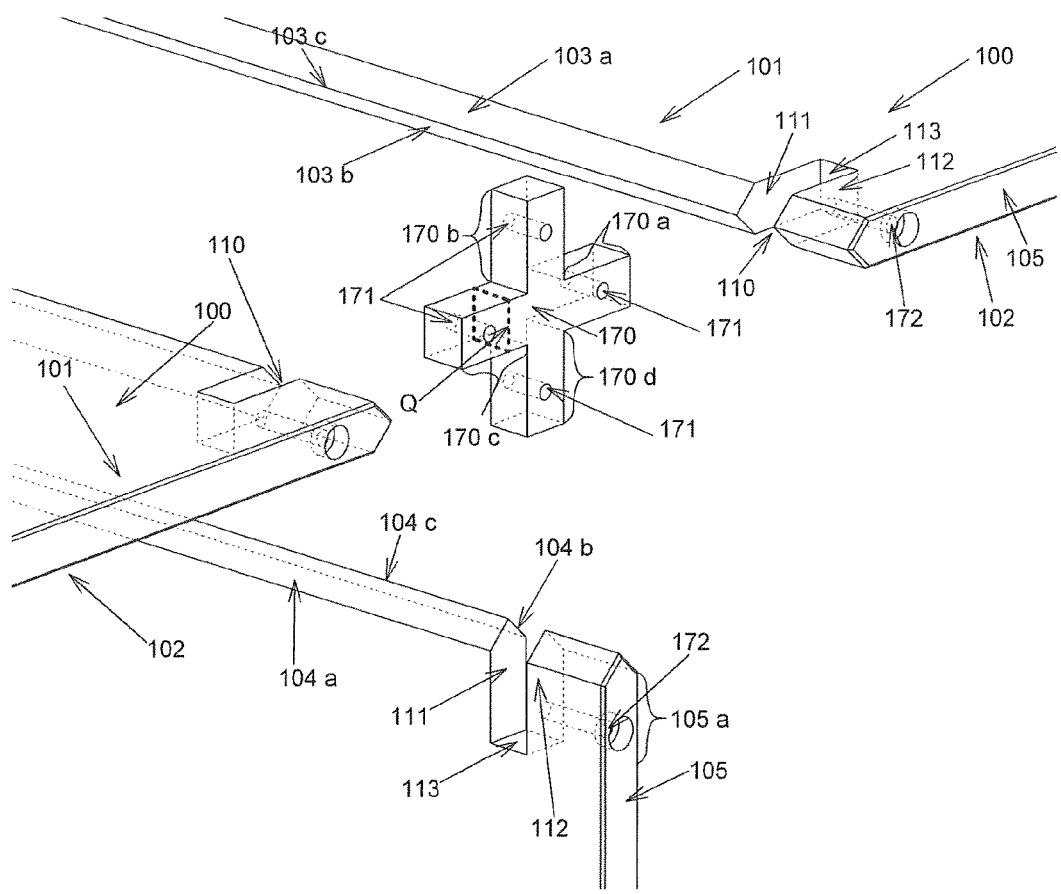
FIG. 3*a*: a first enlarged section of the exploded view from FIG. 1, FIG. 3*b*: a second enlarged section of the exploded view from FIG. 1, FIG. 3*c*: the enlarged section from FIG. 3*b* showing use of a first variation of the L-shaped connecting element.
Figure 3B:
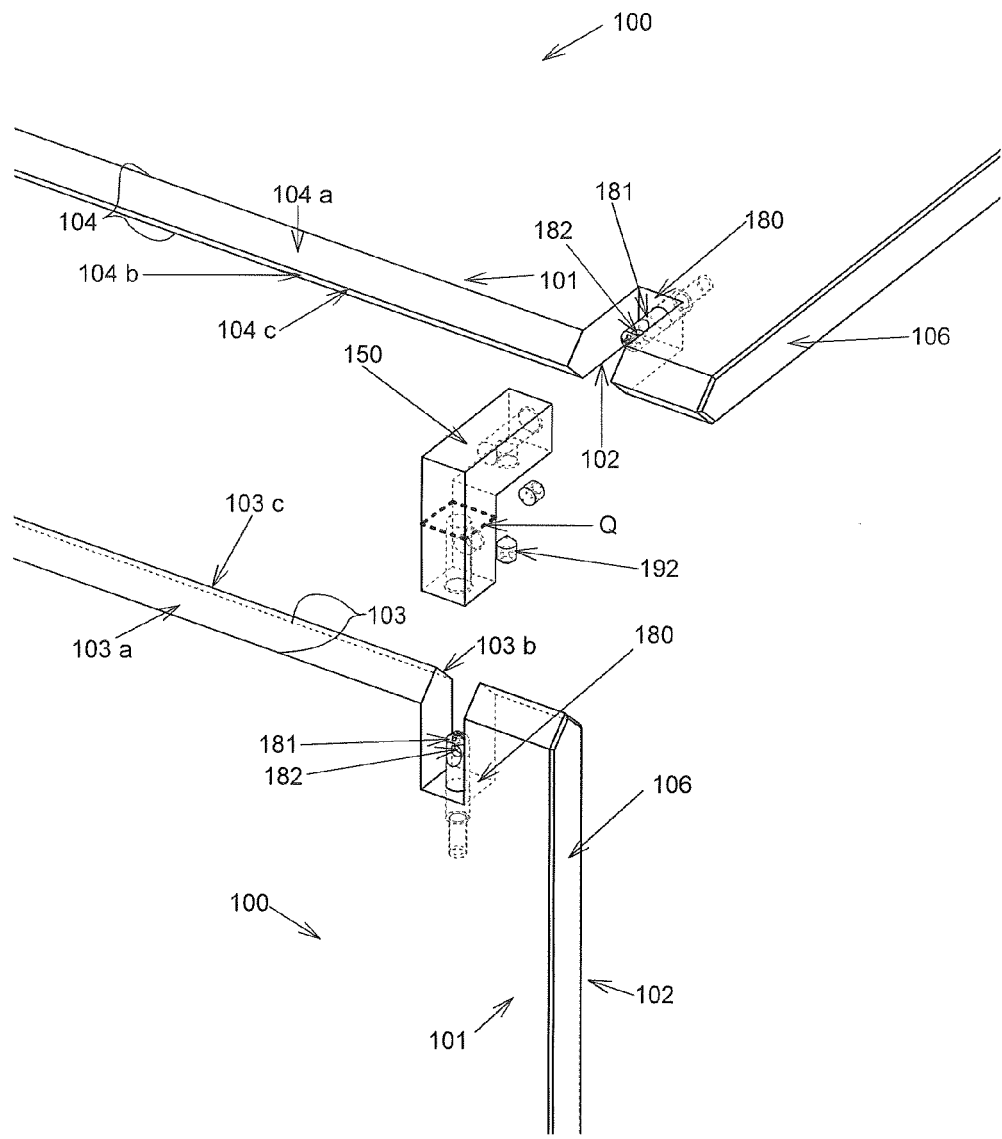
FIG. 3*d*: the enlarged section from FIG. 3*b* showing use of a second variation of the L-shaped connecting element.

Furthermore, the wall modules 100 depicted in FIG. 1 each comprise recesses 110, the design of which one can gather particularly well from the enlarged details according to FIGS. 3*a* and 3*b* in conjunction with FIG. 1.

Beginning from the contact area 103 or 104 on one side of the wall module 100, the recesses 110 run in a direction toward the opposite contact area 104 or 103 on the oppositely arranged side of the wall module 100. They thereby pass through the wall module 100 from one wall surface 101 to the oppositely arranged wall surface 102 and lie between portions 105*a*, 106*a* of the front surface 105 and the rear surface 106 of the wall module 100 which are arranged opposite one another, such that they are surrounded on three sides by the material from which the wall module 100 is made, in such a manner, in fact, that the embodiment, described purely exemplary herein in terms of the shape of the recesses 110 and connecting elements 150, 160, 170, define a first boundary surface 111 and a second boundary surface 112, which define portions of the boundary between recess 110 and material of the wall module 100, extending parallel to the front surface 105 and to the rear surface 106 and perpendicular to the wall surfaces 101, 102, while the third boundary surface 113 extends perpendicularly to the front surface 105 and to the rear surface 106 and perpendicular to the wall surfaces 101, 102.

Three types of connecting elements belong to the modular system 10 for furniture, exhibition structures and the like, as can be seen, for example, in FIG. 1: L-shaped connecting elements 150, T-shaped connecting elements 160 and cruciform connecting elements 170, the shape of each of which can, for example, be assembled from the bar-shaped portions labeled 150a, 150b, 160a to 160c, 170a to 170d in FIGS. 2a, 2b, 3a and 3b, wherein it is not important how one defines the corresponding bar-shaped portions in order to achieve the total shape of the connecting element. In this embodiment, the bar-shaped portions 150a, 150b, 160 a-c and 170 a-d thus represent the arms of the L-shaped, T-shaped or cruciform connecting elements.

FIG. 2a shows a segment of an item of furniture, exhibition structure or the like assembled from the modular system 10 represented in FIG. 1 in its assembled condition. The segment consists of three wall modules 100, which are connected to one another using two T-shaped connecting elements 160, such that two of the wall modules 100 are arranged one above the other in a direction which is perpendicular to the floor, connected to one another by the T-shaped connecting elements 160, such that they touch one another along their contact lines 103c, 104c, which are not discernible in FIG. 2a. Perpendicular thereto, that is, extending parallel to the floor, the third wall module 100 is arranged on the T-shaped connecting elements 160, such that its contact areas 104a, 104b, which are not discernible in FIG. 2a, are in contact with one each of the contact areas of the upper wall module and the lower wall module.

Figure 2:
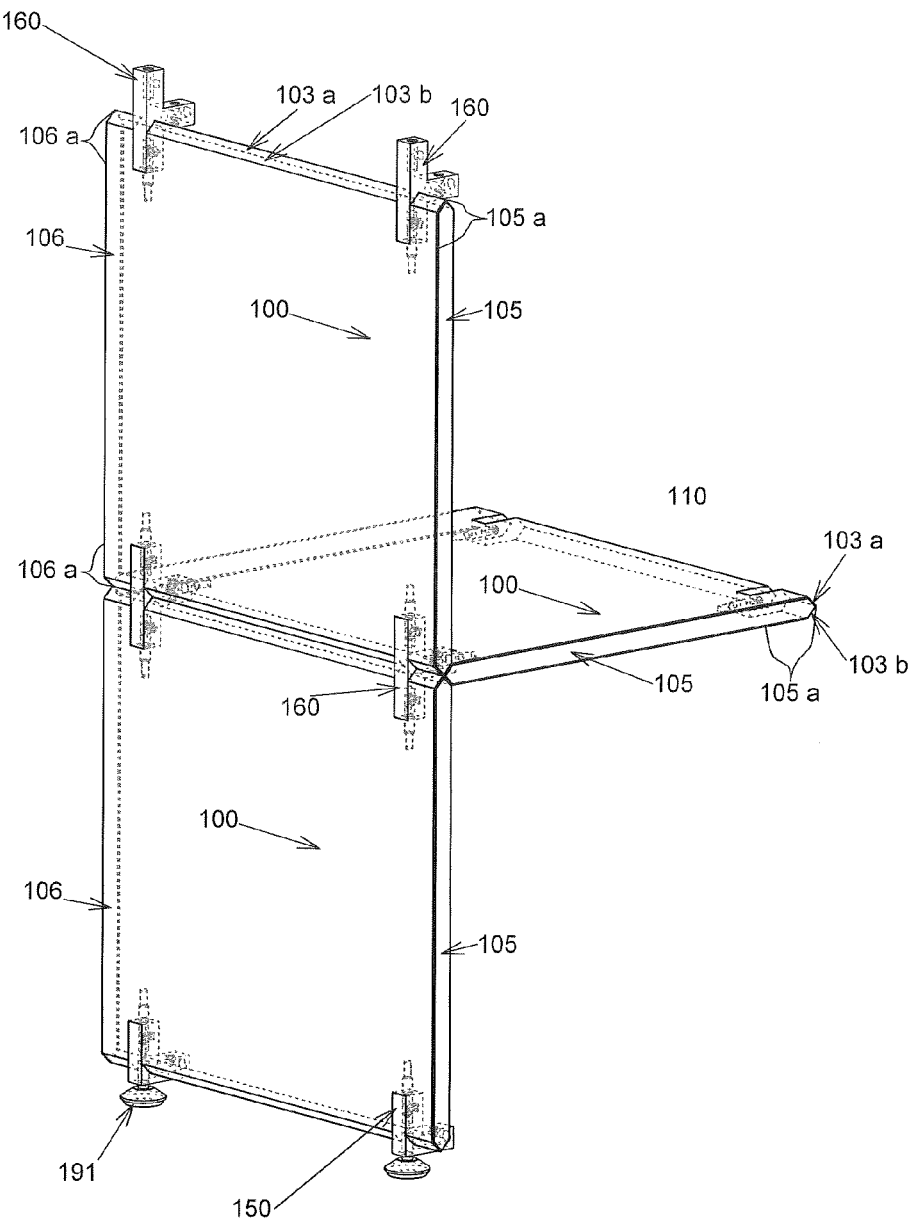
FIG. 2*a*: a segment of an item of furniture, exhibition structure or the like, assembled from the modular system represented in FIG. 1 in its assembled condition.
FIG. 2*b*: an enlarged section from FIG. 2*a*, illustrating the load transfer made possible by a modular system according to the invention.
Figure 2:
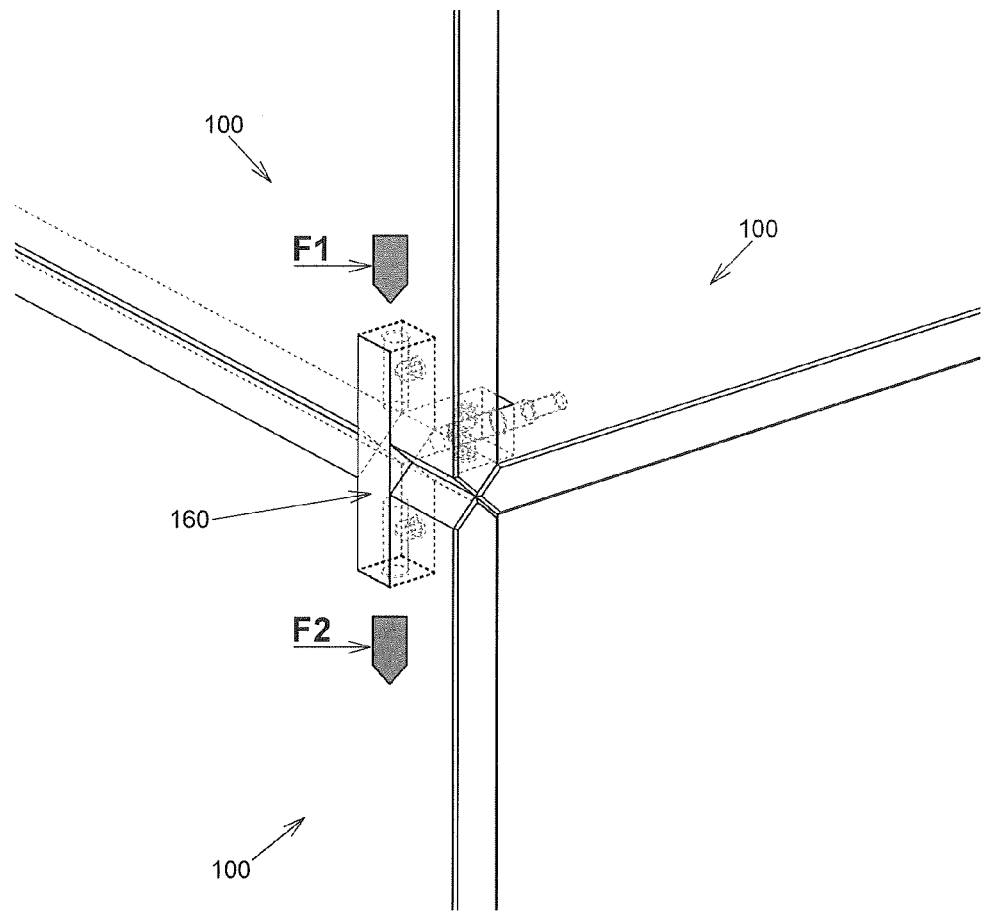

FIG. 2 shows a dilemma which previously arose due to the wedge-shaped design of the contact areas 103a, 103b, 104a, 104b, in particular on the edge of the furniture, exhibition structure or the like. On the one hand, this design is in fact well suited to transfer the load which is exerted on horizontally extending wall modules 100 during use of the furniture or exhibition structure to adjacent, perpendicularly extending wall modules which are closer to the floor. On the other hand, however, load transfer in a direction perpendicular to the floor is problematic, since there is no stabilization in the fourth direction.

This problem can be mitigated, however, through the design of recesses 110 and connecting elements 150, 160, 170 according to the invention, as the enlarged section of FIG. 2b shows. The perpendicularly-acting forces F1, which are created by or must be conducted through the upper wall module 100 in this depiction, are transferred to the connecting element 160 and from there transferred to the lower wall module 100. Thanks to the relatively massive design of the connecting element 160 on the one hand, which is adjusted to the thickness of the wall module 100, and the large contact areas between the connecting element 160 and the wall module 100 on the other hand, the load transfer can take place largely or even completely through the connecting element 160, in particular also safely preventing a breakout of the same, even under the influence of greater force due to the geometric shape of the recesses, which are not discernible in FIG. 2b.

As can be seen particularly well in FIGS. 3a and 3b, the cross-section Q, shown by way of example in these figures as a dashed line on a bar-shaped portion is adapted to the shape of the recess 110.

Figure 3:
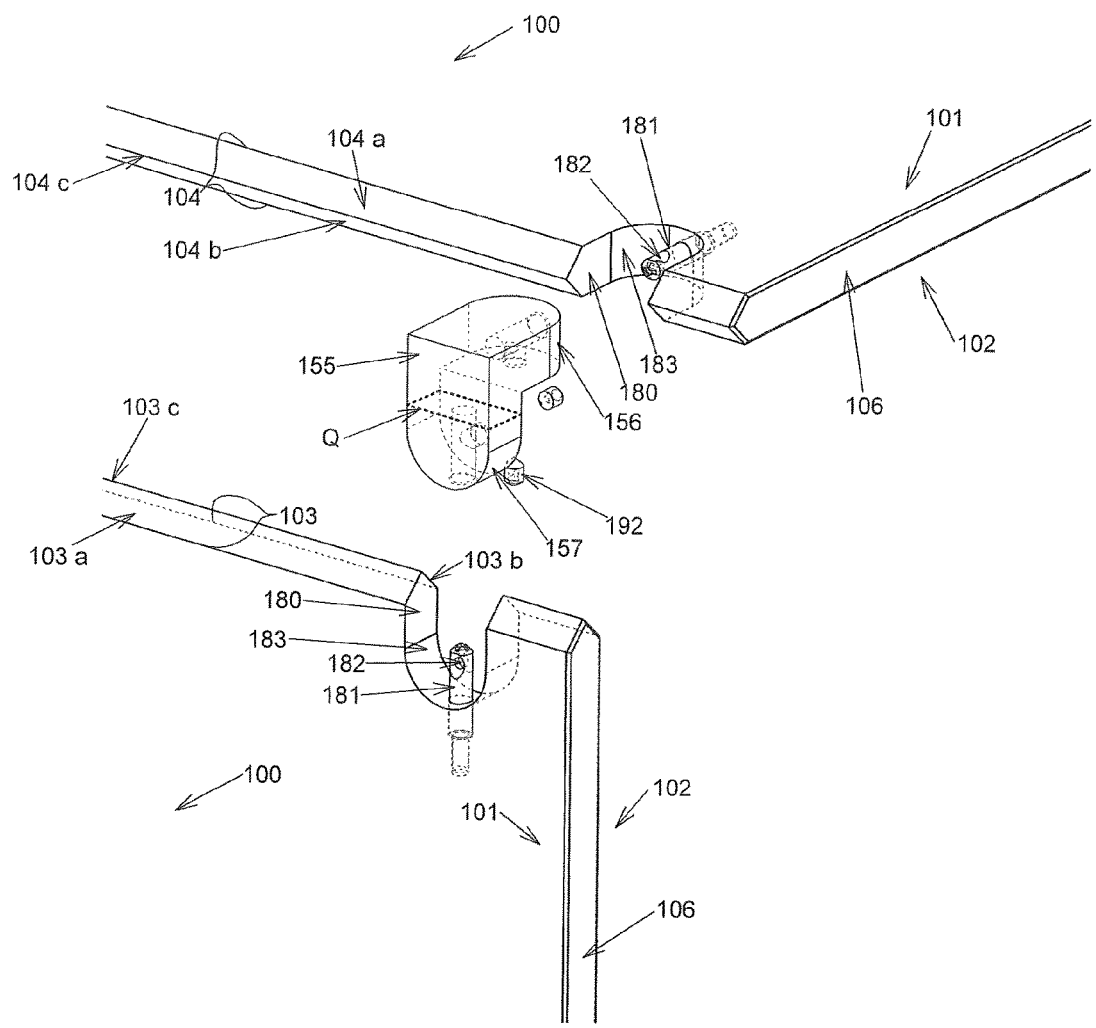
Figure 3:
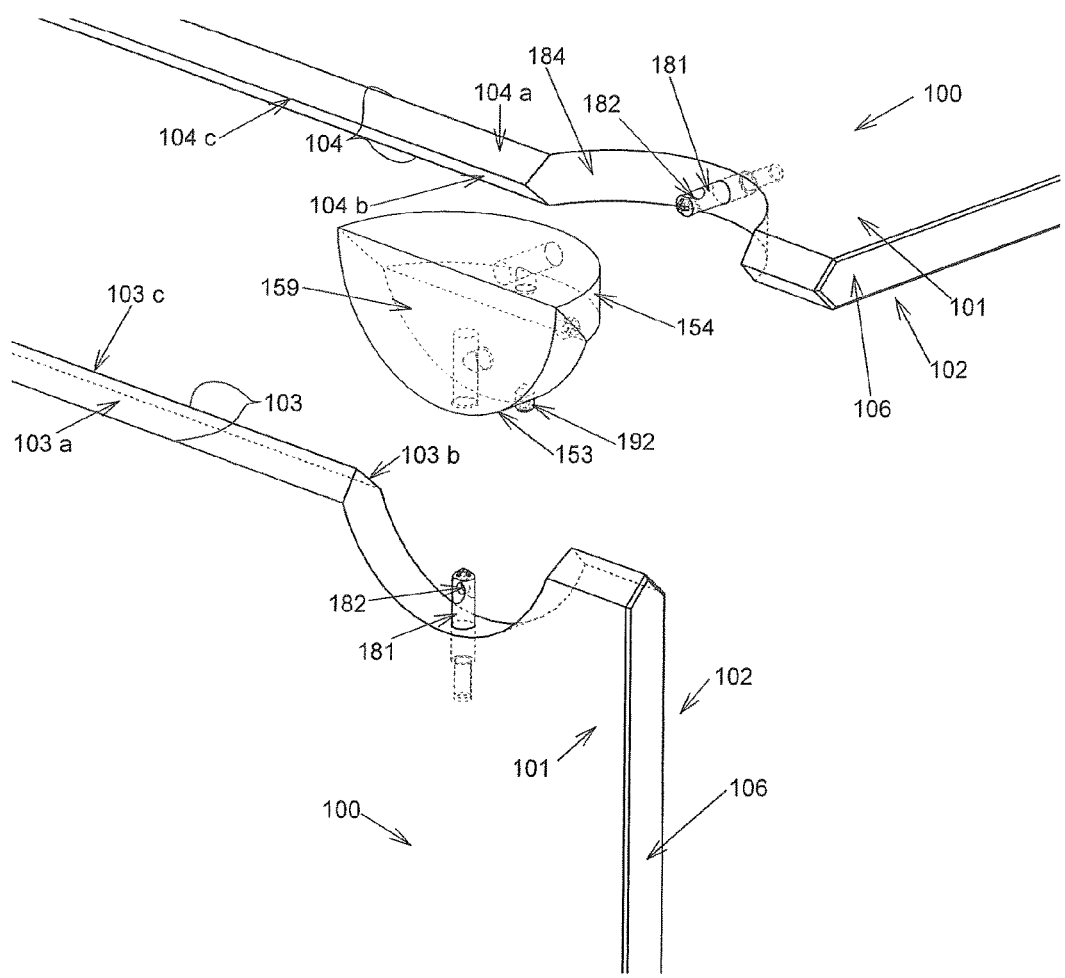

In FIGS. 3a and 3b, two different types of fixation of the wall module 100 to the connecting elements 150, 170 are shown by way of example. In the depiction according to FIG. 3 a, a threaded bore 171 is drilled into each of the four bar-shaped portions of the connecting element 170, and in the front surface 105 or the back surface 106, a bore 172 is provided, through which a screw can be inserted during assembly of the item of furniture and screwed into the threaded bore, such that a secure and load-bearing connection between the wall module 100 and the connecting element 170 is created.

Figure 4:
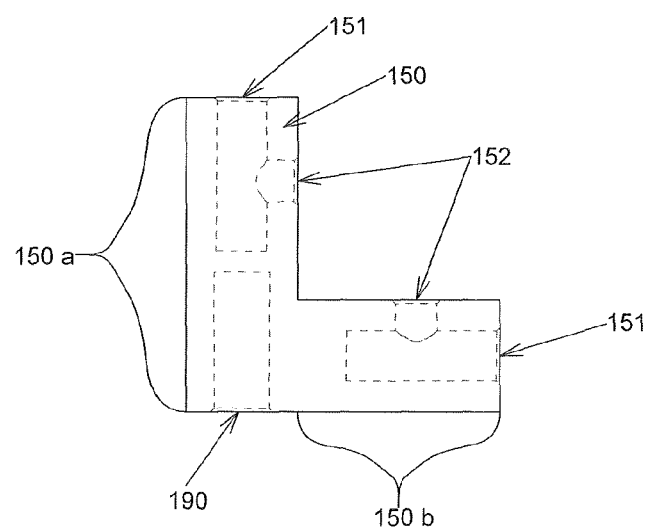
FIG. 4*a*: a cross sectional view through an L-shaped connecting element.
FIG. 4*b*: a cross sectional view through a T-shaped connecting element.
Figure 4:
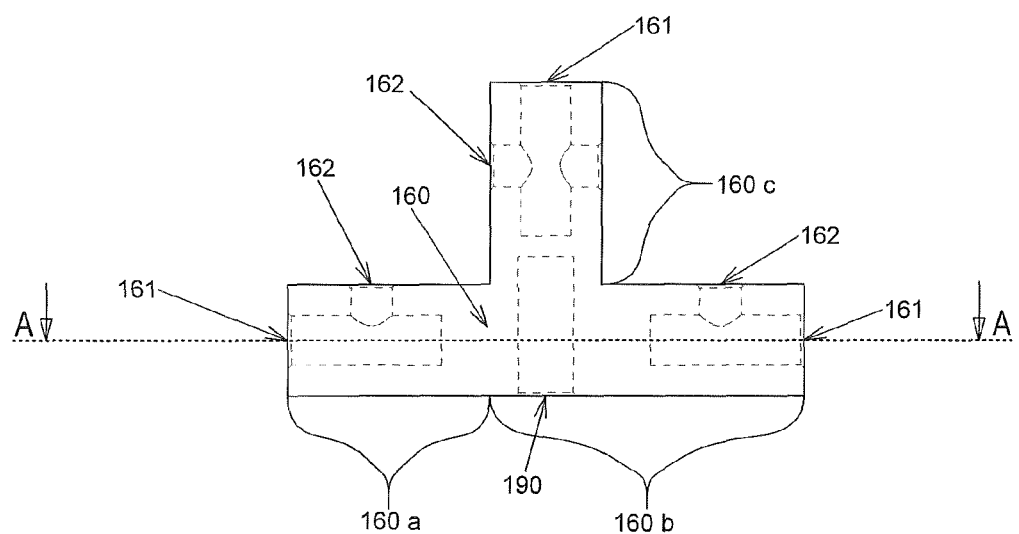

An additional possibility for fixation is shown by way of example in FIG. 3b for an L-shaped connecting element 150, wherein for purposes of a clearer understanding, reference is made as well to FIGS. 4a and 4b, which show cross-sections of connecting elements 150, 160, which are configured for the possibility of fixation now described.

As can be seen in FIG. 3b, a tenon 181 is centrally screwed into the bordering surface 180 on the recess 110 of the contact area 104 which is arranged opposite to the contact area 103, from which the recess 110 extends, which is passed through by a bore 182, preferably a bore with a spherical insertion portion. The threaded bore 182 is thus oriented by screwing in the peg 181, such that it lies in the direction of the connection line between the wall surfaces 101, 102 of the wall module 100. In the bar-shaped portions 150a, 150b or 160a-c, which are to be inserted into the recess 110, there is respectively provided a central first bore 151 or 161, which can best be seen in the cross-sectional views according to FIGS. 4a and 4b, corresponding with the tenon 181 in such a way that the tenon 181 inserted into the bore 151 or 161 creates a continuous transition between the wall surface 101, 102 and the corresponding surfaces of the connecting elements 150, 160, 170.

In order to fix the connecting element 150 or 160 in this position, a second bore 152 or 162 is additionally provided in each of the bar-shaped sections 150a, 150b or 160a-c, which is perpendicular to the first bore 151 or 161, extending in the direction of the connection line of the wall surfaces 101, 102 of the respective wall module 100, in the recess 110, of which the respective bar-shaped portion 150a, 150b or 160a-c is inserted during assembly of the item of furniture or exhibition structure, which, if the connection element 150 or 160 is combined with the wall module 100, communicates with the bore 182, so that the connecting element 150 is connectable to or can be fixed to the wall module 100 by means of engagement in the bore 182, particularly through the use of set screws 192.

FIGS. 3c and 3d each show the situation represented in FIG. 3b, although they differ in terms of the shape of the connecting element 155 or 159, and the corresponding recesses of the wall module 100. They show in particular how the design according to the invention need not necessarily be assembled from bar-like portions, but rather that a partial or even totally different shape is also possible for the connecting elements 155, 159 and that the recess 110 likewise need not necessarily have a rectangular basic shape. What is important is the matching between the surfaces which form the boundary surfaces between the wall module 100 and the connecting element 150, 155, 159, 160 or 170 inserted into the wall module 100, i.e. in FIGS. 3c and 3d in particular the surfaces 156, 157 and 153, 154 and the corresponding boundary surfaces of the wall module within the recess 183 or 184. It is self-evident that this shape, which pertains particularly to the portions to be received by the respective recesses of the wall module 100, is not only possible for the L-shaped connecting elements 155, 159, as shown in FIGS. 3c and 3d, but is also applicable to T-shaped and cruciform connecting elements.

FIGS. 4a and 4b furthermore show an additional optional threaded bore 190 in dashed lines. The threaded bore 190 makes it possible to screw a furniture foot 191 arranged on a screw, as is shown in FIG. 1, into the respective connecting elements 150, 160, 170, and naturally also into connecting elements 155, 159 having the shapes resulting from the design principles shown in FIGS. 3c and 3d. This brings with it the possibility of also setting up the item of furniture assembled from the modular system 10 or the exhibition structure assembled therefrom on an uneven floor in such a way that slanting, particularly of wall modules 100, which form the floor of a compartment or the rack floor of the item of furniture or exhibition stand, can be avoided.

Naturally, this attachment possibility is also directly applicable to a cruciform connecting element. This follows directly when one considers that a cross-section through a cruciform connecting element 170 results when one neglects the optional threaded bore 190 and reflects that portion of the T-shaped connecting element 160 lying above the axis A-A, shown as a dotted line, on said axis.

LIST OF REFERENCE FIGURES

10 Modular system
100 Wall module
101, 102 Wall surfaces
103, 104 Contact areas
103a, 103b, 104a, 104b Subareas of a contact area
103c, 104c Contact line
105 Front surface
105a Portion of the front surface
106 Rear surface
106a Portion of the rear surface
110 Recess
111 First boundary surface
112 Second boundary surface
113 Third boundary surface
150, 155, 159 L-shaped connecting element
150a, 150b Bar-shaped portions
151, 161 First bore
152, 162 Second bore
153, 154, 156, 157 Surfaces of the connecting element
160 T-shaped connecting element
160a, 160b, 160c Bar-shaped portions
170 Cruciform connecting element
170a, 170b, 170c, 170d Bar-shaped portions
171 Threaded bore
172 Bore
180 Wall portion
181 Tenon
182, 190 Threaded bore
183, 184 Surfaces of the wall module
191 Furniture foot
192 Set screw
A-A Axis
Q Cross-section

What is claimed is:

1. A modular system suitable for furniture, or exhibition structures, each comprising:
 interlocking wall modules, each module comprising:
  longitudinally directed wall surfaces opposite each other;
  a front surface and a rear surface opposite said front surface;
  wall module contact areas opposite each other;
  at least one longitudinally directed aperture, beginning from the contact areas and terminating with a pre-designated internal shape, the aperture passing through the wall surfaces and disposed interior to the front and rear surfaces, and
  a longitudinally directed tenon within the aperture, integral to the wall module and extending from the pre-designated internal shape towards the contact areas, the tenon further having at least a bore hole through the tenon and a conical cut-out, disposed in an orthogonal direction to an axis of the tenon; and
 connecting elements for connecting the wall modules to each other, comprising:
  extended portions having at least one L-shaped, T-shaped or cruciform cross-sectional area, a thickness of the extended portions being equivalent to a thickness of the wall module, a terminal end of the extended portions being matched to the pre-designated internal shape of the aperture;
  a longitudinal bore hole in the extended portions for precisely receiving the tenon from the wall module's aperture; and
  a threaded hole orthogonal to the longitudinal bore hole and positioned to be coincident with at least the tenon's bore hole and conical cut-out, when joined with the wall module,
 wherein in an assembled state, and secured together with a set screw inserted into the connector's threaded hole to engage at least the tenon's bore hole and conical cut-out, a flat, unobstructed surface is present at a junction of a wall module's recess and extended portion of the connecting element.

2. The modular system according to claim 1, wherein an extent of a rectangular cross-section (Q) of bar-shaped portions of the connecting elements in a direction of a side of the rectangle defining said cross-section (Q) corresponds to a distance between the wall surfaces of the wall module situated opposite one another, and in a direction of an other side of the rectangle corresponds to an extent of the wall module's recess in a direction of a direct connection between the front surface and rear surface of the wall module.

3. The modular system according to claim 2, wherein at least a portion of the connecting element's longitudinal bore hole is threaded, which, when the connecting element is inserted as intended by a portion into the recess of a wall module, runs in a direction of the direct connection between the front surface and rear surface of the wall module.

4. The modular system according to claim 2, wherein at least one connecting element has a threaded bore for adjustably receiving a furniture foot arranged on a screw.

5. The modular system according to claim 2, wherein the wall module's recess is spaced equidistant from the front surface and the rear surface of the wall module.

6. The modular system according to claim 2, wherein the recess is spaced equidistant from the front surface and the rear surface of the wall module.

7. The modular system according to claim 2, wherein the contact area is configured as a wedge shape and comprises subareas, which, begins from the wall surfaces extend at an angle of 45° from said wall surfaces outwardly to converge with one another.

8. The modular system according to claim 1, wherein at least a portion of the connecting element has a threaded bore, which, when the connecting element is inserted as intended by a portion into the recess of the wall module, runs in a direction of a direct connection between the front surface and rear surface of the wall module.

9. The modular system according to claim 8, wherein at least one connecting element has a threaded bore for adjustably receiving a furniture foot arranged on a screw.

10. The modular system according to claim 8, wherein the wall module's recess is spaced equidistant from the front surface and the rear surface of the wall module.

11. The modular system according to claim 1, wherein at least one of the connecting elements has a threaded bore for adjustably receiving a furniture foot arranged on a screw.

12. The modular system according to claim 1, wherein the wall module's recess is spaced equidistant from the front surface and the rear surface of the wall module.

13. The modular system according to claim 1 wherein the contact area of the wall module is configured as a wedge shape and comprises subareas, which, begins from wall surfaces extend at an angle of 45° from said wall surfaces outwardly to converge with one another.

14. The modular system according to claim 1, wherein a load of the wall module, when arranged perpendicular to a floor on which an item of furniture or an exhibition structure stands, is passed to the connecting elements which connect the respective wall module with the adjacent wall module arranged perpendicularly to the floor in a direction toward the floor, and is transferred from the connecting elements to an adjacent wall module.

15. The modular system according to claim 14, wherein subareas of the contact areas of different wall modules are supported by one another.

16. The modular system according to claim 1, wherein at least one connecting element has a threaded bore for adjustably receiving a furniture foot arranged on a screw.

* * * * *